US012532314B2

(12) United States Patent
Takeda et al.

(10) Patent No.: US 12,532,314 B2
(45) Date of Patent: Jan. 20, 2026

(54) DYNAMIC POWER SHARING PROCESSING IN A COMMUNICATIONS NETWORK

(71) Applicant: QUALCOMM Incorporated, San Diego, CA (US)

(72) Inventors: Kazuki Takeda, Minato-ku (JP); Peng Cheng, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 17/922,129

(22) PCT Filed: May 15, 2020

(86) PCT No.: PCT/CN2020/090611
§ 371 (c)(1),
(2) Date: Oct. 28, 2022

(87) PCT Pub. No.: WO2021/227044
PCT Pub. Date: Nov. 18, 2021

(65) Prior Publication Data
US 2023/0180222 A1 Jun. 8, 2023

(51) Int. Cl.
*H04W 72/12* (2023.01)
*H04W 24/10* (2009.01)
(Continued)

(52) U.S. Cl.
CPC ....... *H04W 72/1268* (2013.01); *H04W 24/10* (2013.01); *H04W 72/23* (2023.01)

(58) Field of Classification Search
CPC ..... H04W 72/12; H04W 72/04; H04W 72/21; H04W 72/23; H04W 24/10; H04W 52/14;
(Continued)

(56) References Cited

U.S. PATENT DOCUMENTS 9,615,336 B2 * 4/2017 Vajapeyam ........... H04W 52/40
9,629,094 B2 * 4/2017 Damnjanovic ....... H04W 52/50
(Continued)

FOREIGN PATENT DOCUMENTS

CN          107113747 A    8/2017
WO          2014190334     11/2014
(Continued)

OTHER PUBLICATIONS

Ericsson: "Power Control for NR-NR DC", 3GPP TSG-RAN WG1 #97, R1-1907330_CADC_ULPC V0, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 4, 2019, XP051709352, 4 pages.

(Continued)

*Primary Examiner* — Man U Phan
(74) *Attorney, Agent, or Firm* — Loza & Loza, LLP

(57) ABSTRACT

Technologies and techniques are disclosed for wireless communication in a dual connectivity wireless communication network. A first uplink timing value is determined for control information to a first cell group. A second uplink timing value is determined for control information to a second cell group. Transmit power may be determined and allocated for the first and second uplink communications. A timing offset value is determined relative to the second timing value and transmitted to the wireless communication network. Scheduling information is received in response to transmitting the timing offset value, and at least one of the first uplink communication or the second uplink communication are transmitted based on the scheduling information.

24 Claims, 15 Drawing Sheets

(51) Int. Cl.
*H04W 72/1268* (2023.01)
*H04W 72/23* (2023.01)

(58) Field of Classification Search
CPC ..... H04W 52/02; H04W 52/34; H04W 52/32;
H04W 52/36; H04W 52/58; H04W 74/08;
H04L 1/18; H04L 1/08; H04L 5/00;
H04L 5/14; H04L 27/26
USPC .......................................................... 370/329
See application file for complete search history.

(56) References Cited

U.S. PATENT DOCUMENTS

| | | | | |
|---|---|---|---|---|
| 10,045,332 | B2* | 8/2018 | Kitazoe | H04W 56/0015 |
| 10,057,861 | B2* | 8/2018 | Chen | H04L 43/08 |
| 10,588,040 | B2* | 3/2020 | Huang | H04W 24/08 |
| 10,609,663 | B2* | 3/2020 | Vajapeyam | H04W 24/10 |
| 10,813,136 | B2* | 10/2020 | Yerramalli | H04W 52/38 |
| 11,265,833 | B2* | 3/2022 | Vajapeyam | H04W 56/0065 |
| 11,523,295 | B2* | 12/2022 | Harada | H04W 76/15 |
| 11,528,645 | B2* | 12/2022 | Jang | H04L 5/0091 |
| 11,985,619 | B2* | 5/2024 | Ying | H04W 24/10 |
| 12,192,996 | B2* | 1/2025 | Yang | H04L 1/1896 |
| 2016/0044599 | A1 | 2/2016 | Damnjanovic et al. | |
| 2018/0176905 | A1* | 6/2018 | Li | H04W 52/14 |

FOREIGN PATENT DOCUMENTS

| | | |
|---|---|---|
| WO | 2015172057 | 11/2015 |
| WO | 2015187267 | 12/2015 |
| WO | 2016007269 | 1/2016 |
| WO | 2016182527 A1 | 11/2016 |

OTHER PUBLICATIONS

Qualcomm Incorporated: "Remaining Issues on Uplink Power Control for NR-DC", 3GPP TSG-RAN WG1 #100, R1-2000980, 3rd Generation Partnership Project, Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020, XP052344041, 6 pages.

Qualcomm Incorporated: "Remaining Issues on Uplink Power Control for NR-DC", 3GPP TSG-RAN WG1 #99, R1-1912978, 3rd Generation Partnership Project, Mobile Competence Centre, 650, Route Des Lucioles, F-06921 Sophia-Antipolis Cedex, France, vol. RAN vol. RAN WG1, No. Reno, USA, Nov. 18, 2019-Nov. 22, 2019, Nov. 9, 2019, XP051823740, pp. 1-4.

Samsung: "Uplink Power Control for NN-DC", 3GPP Draft, R1-1912495, 3GPP TSG RAN WG1 #99, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823438, pp. 1-3, Introduction; p. 1 p. 1, line 24-p. 2, line 30 figures 1,2.

Supplementary European Search Report—EP20935691—Search Authority—The Hague—Feb. 2, 2024.

International Search Report and Written Opinion—PCT/CN2020/090611—ISA/EPO—Feb. 5, 2021.

* cited by examiner

DYNAMIC POWER SHARING PROCESSING IN A COMMUNICATIONS NETWORK

CROSS-REFERENCE TO RELATED APPLICATION(S)

This application is the U.S. national stage of PCT patent application number PCT/CN2020/090611 filed on May 15, 2020.

TECHNICAL FIELD

The technology discussed below relates generally to wireless communication networks, and more particularly, to techniques for providing improved power sharing in a dual connectivity requirement.

INTRODUCTION

In wireless communication systems, such as those specified under standards for 5G New Radio (NR), an access point (e.g., a base station) may communicate with a user equipment (UE) (e.g., a smartphone). Dual Connectivity is a mode of operation where UEs equipped with multiple receivers and transmitters can be configured to utilize the radio resource of two distinct schedulers, located in two radio base stations (eNBs) configured as a master eNB and secondary eNB connected via a non-ideal back-haul over an X2 interface. In 5G NR configurations, a UE may connect to a Long-Term Evolution (LTE) base station and a 5G NR base station, where each base station may be configured as either a master node or a secondary node. In some configurations, the UE may have access to both LTE and 5G NR simultaneously.

As the demand for mobile broadband access and communications continues to increase, research and development continue to advance wireless communication technologies not only to meet the growing demand for mobile broadband access, but to advance and enhance mobile communications. Accordingly, the present disclosure addresses technologies and techniques to improve power sharing in a dual connectivity operating environment.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method is disclosed of power sharing by a scheduled entity in a wireless communication network, the method comprising determining a first timing value for a first uplink communication comprising first control information to a first cell group, determining a second timing value for a second uplink communication comprising second control information to a second cell group, allocating a transmit power for the first uplink communication and the second uplink communication, determining a timing offset value relative to the second timing value, transmitting the timing offset value to the wireless communication network, receiving scheduling information in response to transmitting the timing offset value, and transmitting at least one of the first uplink communication or the second uplink communication based on the scheduling information.

In another example, a user equipment (UE) is disclosed within a wireless communication network, comprising a transceiver, a memory, and a processor communicatively coupled to the transceiver and the memory, wherein the processor and the memory are configured to determine a first timing value for a first uplink communication comprising first control information to a first cell group, determine a second timing value for a second uplink communication comprising second control information to a second cell group, allocate a transmit power for the first uplink communication and the second uplink communication, determine a timing offset value relative to the second timing value, transmit the timing offset value to the wireless communication network, receive scheduling information in response to transmitting the timing offset value, and transmit at least one of the first uplink communication or the second uplink communication based on the scheduling information.

In another example, a user equipment (UE) is disclosed in a wireless communication network, comprising means for determining a first timing value for a first uplink communication comprising first control information to a first cell group, means for determining a second timing value for a second uplink communication comprising second control information to a second cell group, means for allocating a transmit power for the first uplink communication and the second uplink communication, means for determining a timing offset value relative to the second timing value, means for transmitting the timing offset value to the wireless communication network, means for receiving scheduling information in response to transmitting the timing offset value, and means for transmitting at least one of the first uplink communication or the second uplink communication based on the scheduling information.

In another example, a computer-readable medium is disclosed having stored therein instructions executable by one or more processors to determine a first timing value for a first uplink communication comprising first control information to a first cell group, determine a second timing value for a second uplink communication comprising second control information to a second cell group, allocate a transmit power for the first and second uplink communication, determine a timing offset value relative to the second timing value, transmit the timing offset value to the wireless communication network, receive scheduling information in response to transmitting the timing offset value, and transmit at least one of the first uplink communication or the second uplink communication based on the scheduling information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should

BRIEF DESCRIPTION OF THE DRAWINGS

FIG. 7 is a diagram illustrating dynamic power sharing between a MCG and a

Figure 8:
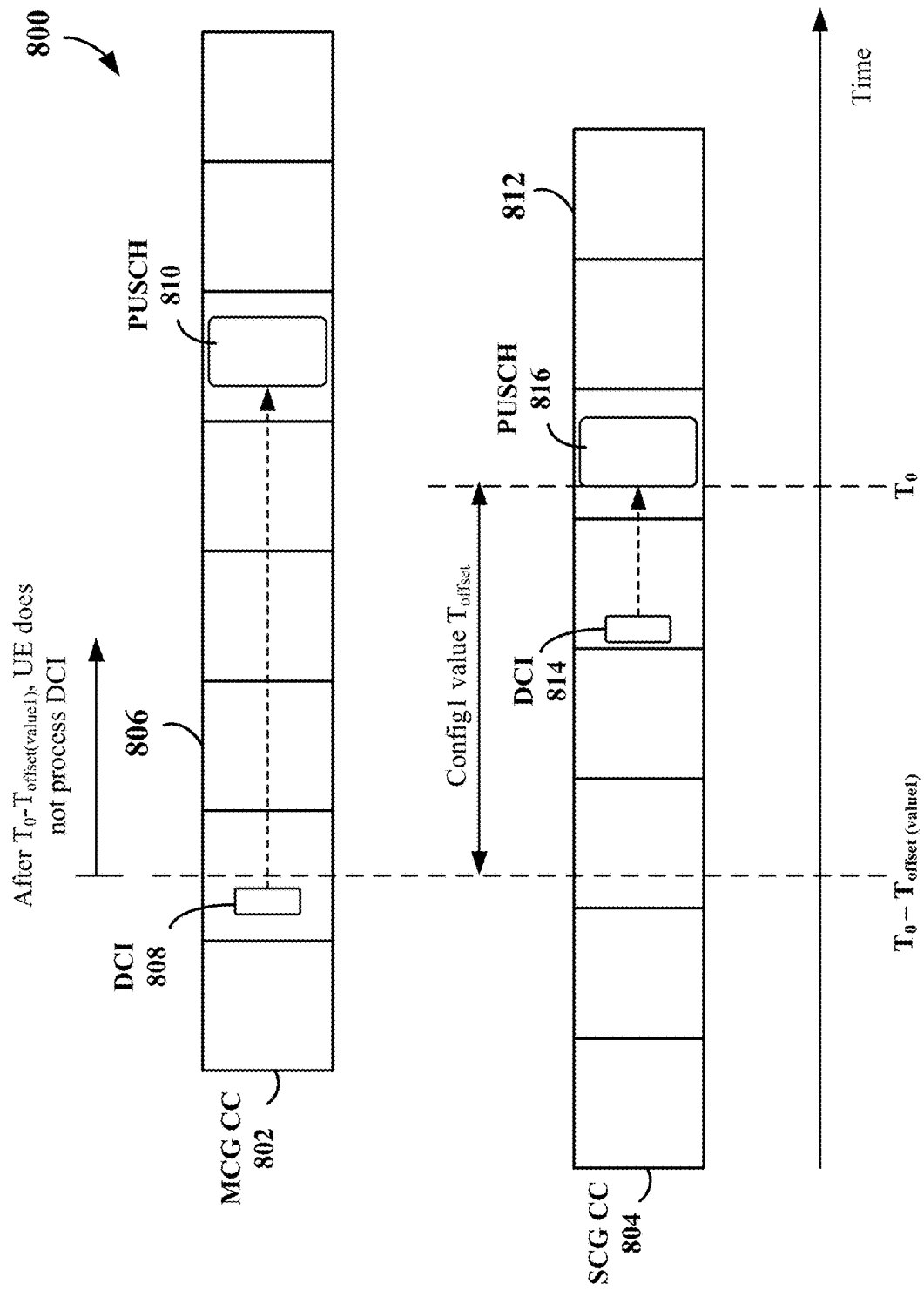

SCG utilizing a quantized fixed transmission time value and timing offset value according to some aspects;

FIG. 8 is a diagram illustrating dynamic power sharing between a MCG and a

Figure 9:
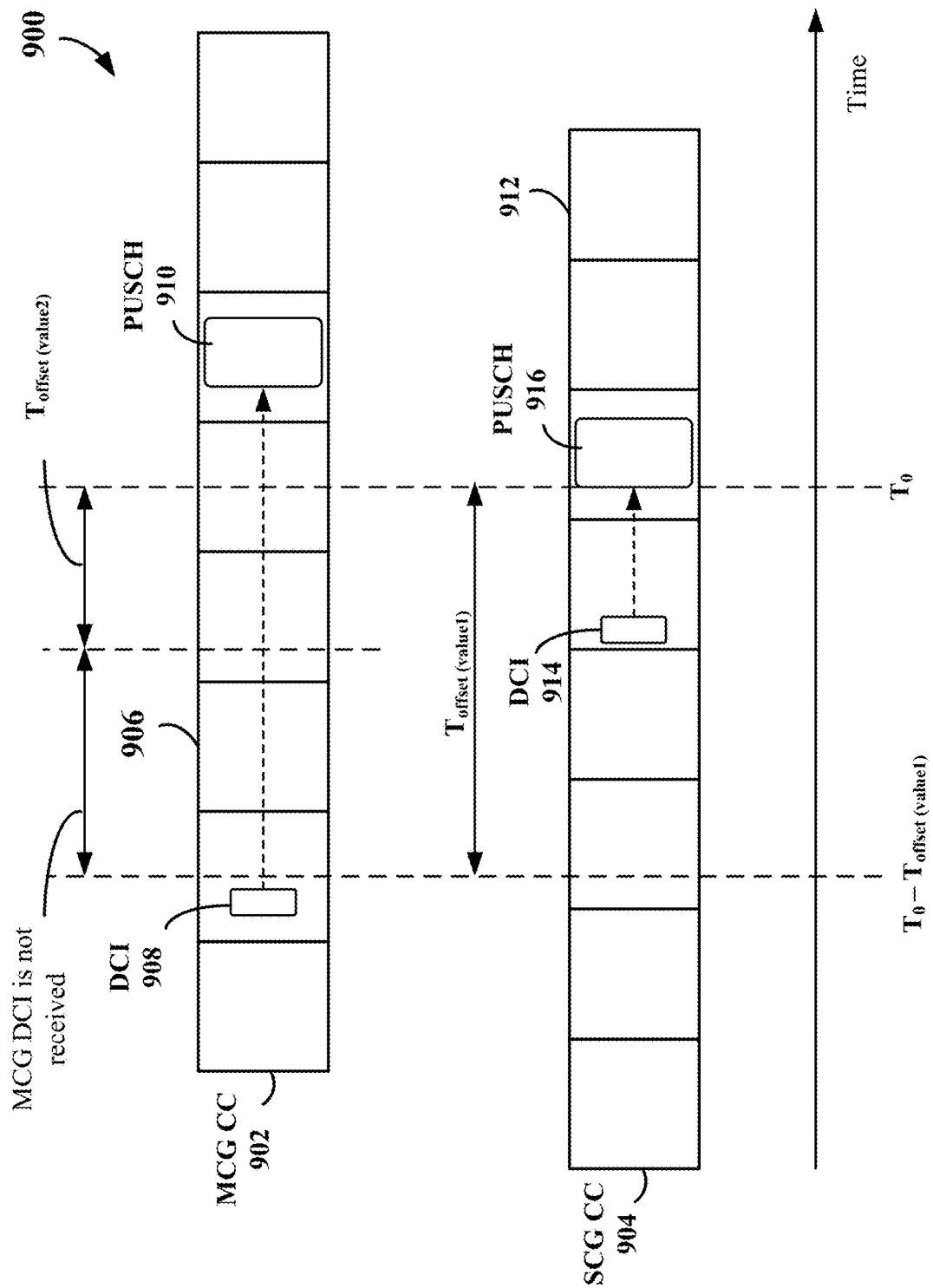

SCG from a network perspective utilizing a fixed transmission time value and timing offset value according to some aspects;

FIG. 9 is a diagram illustrating dynamic power sharing between a MCG and a

Figure 10:
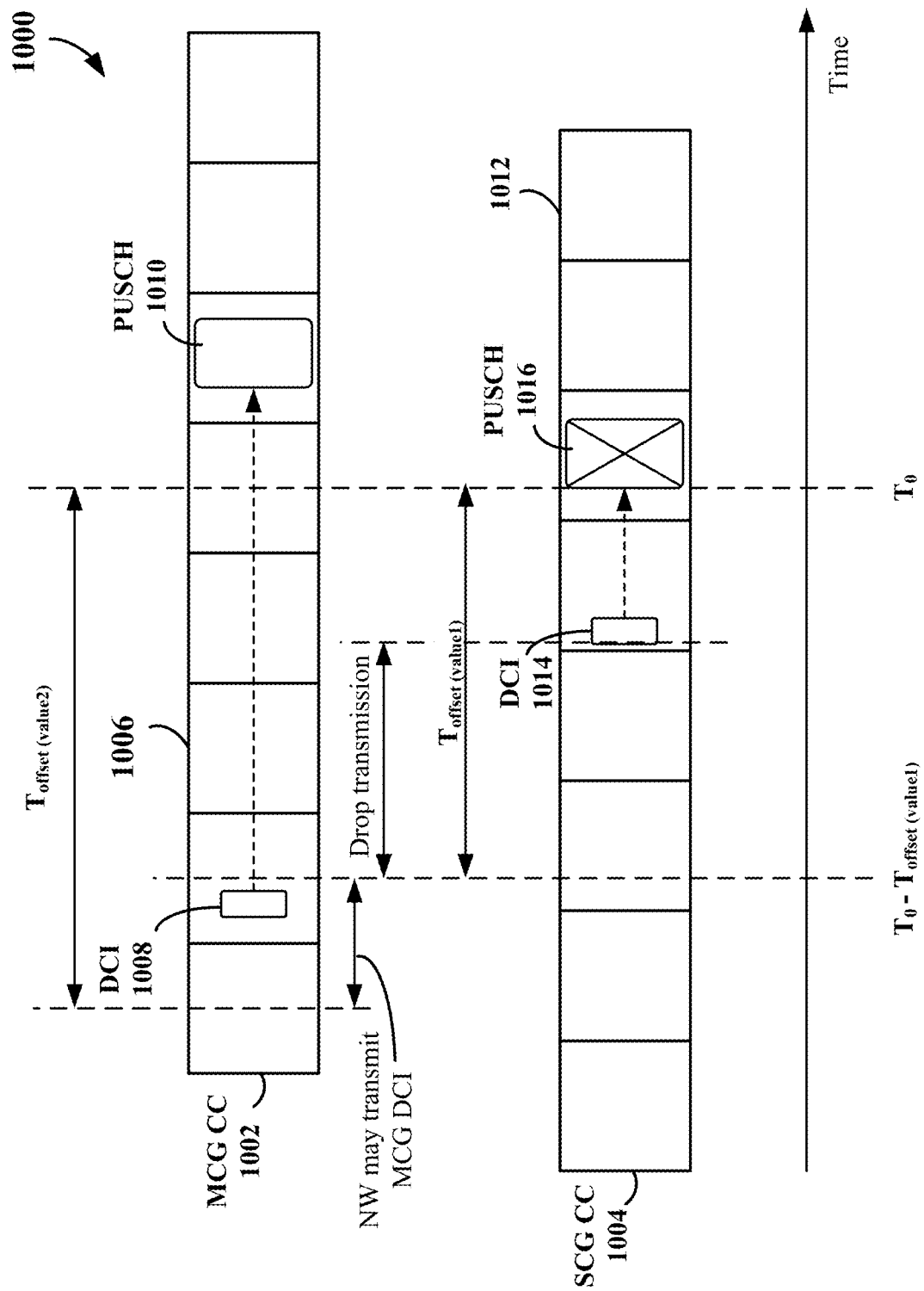
Figure 11:
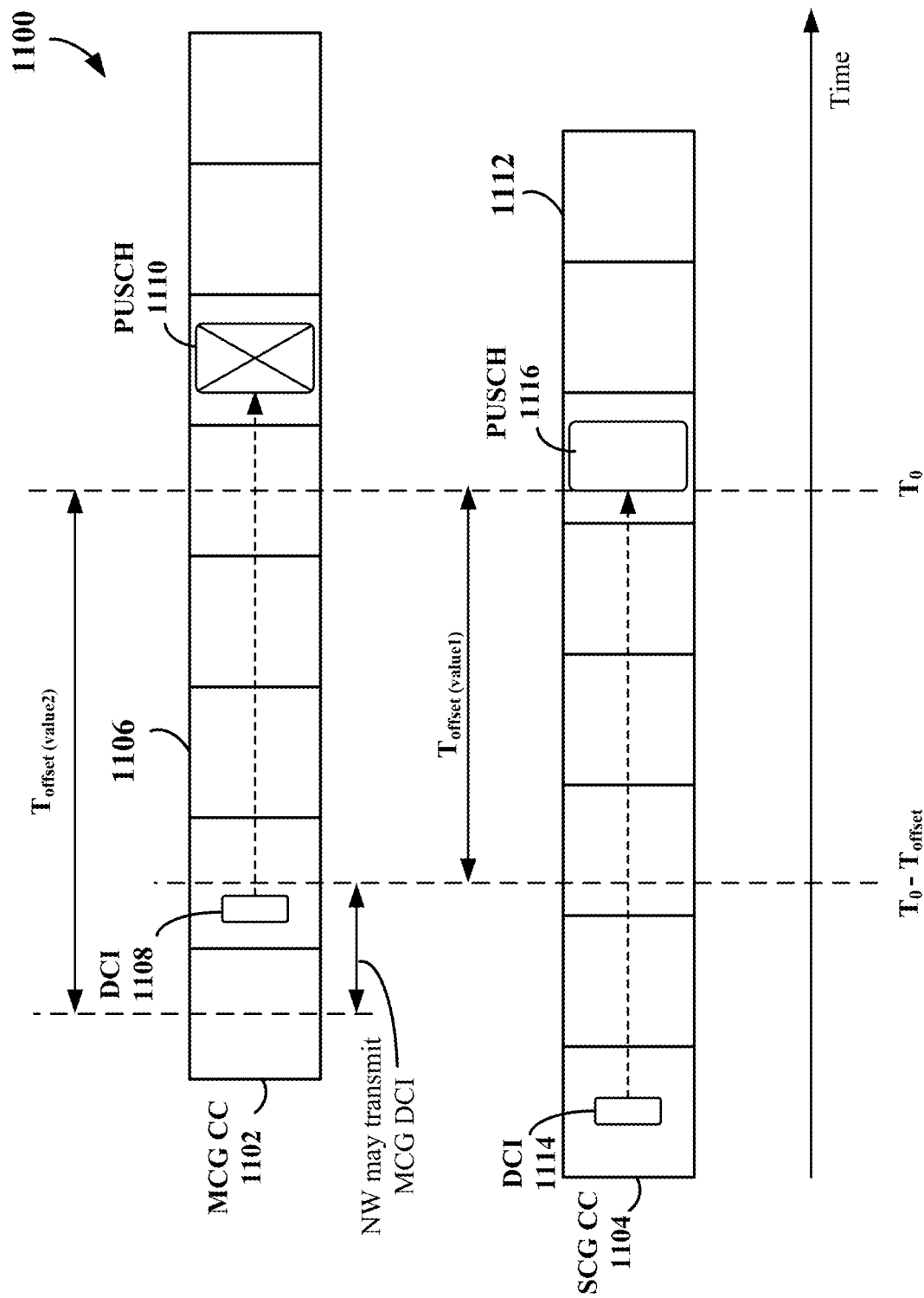
Figure 12:
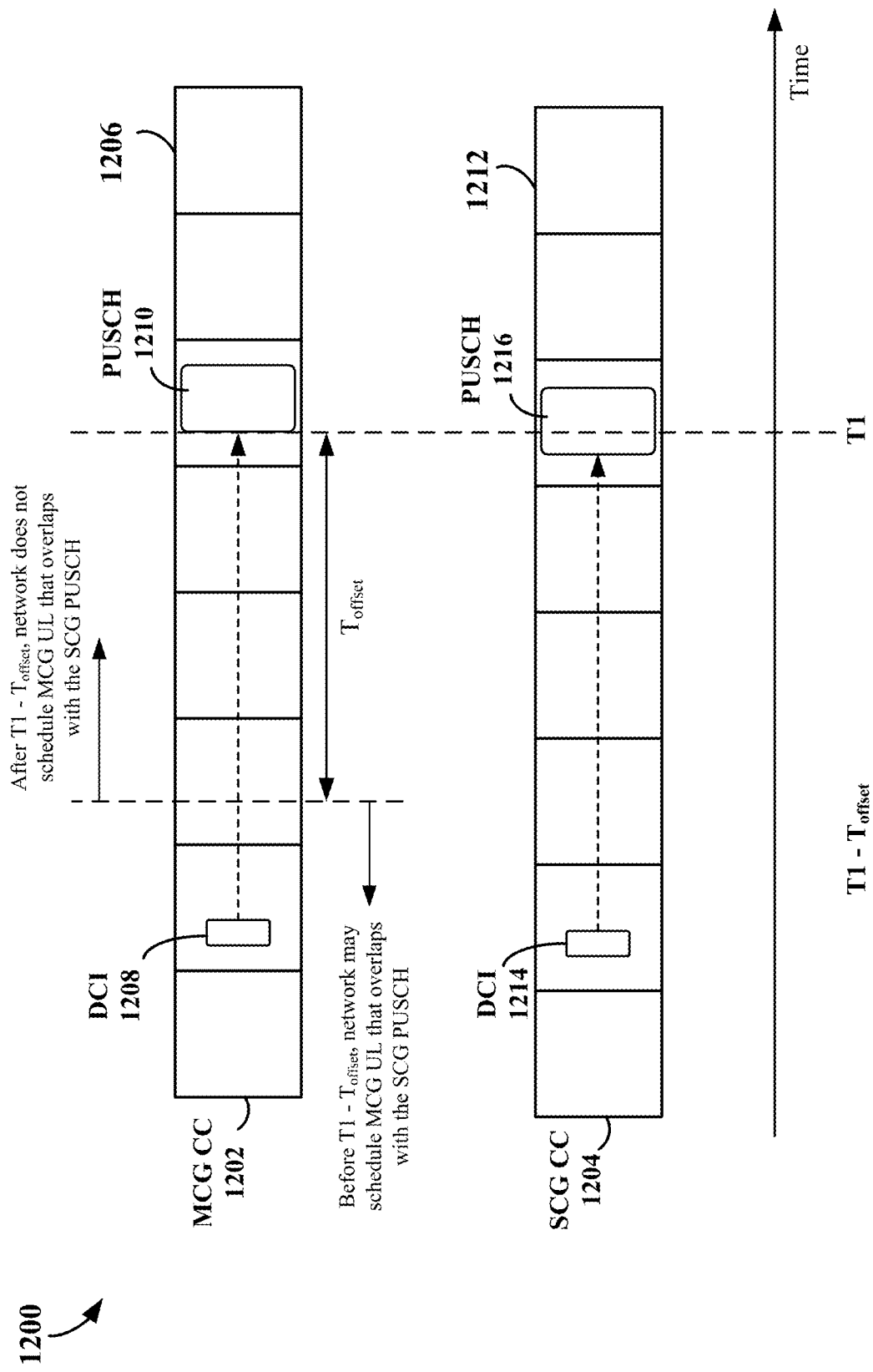
Figure 13:
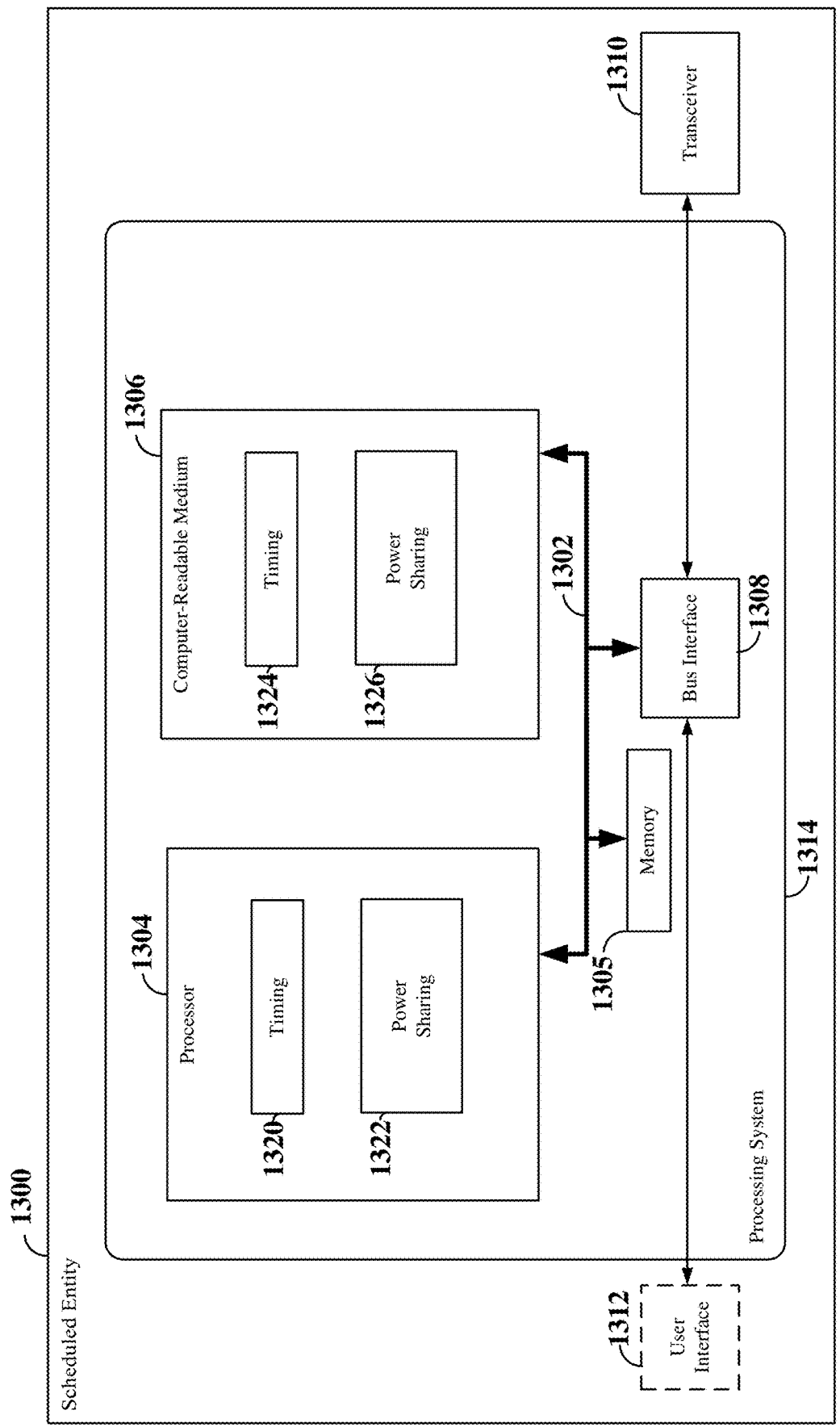
Figure 14:
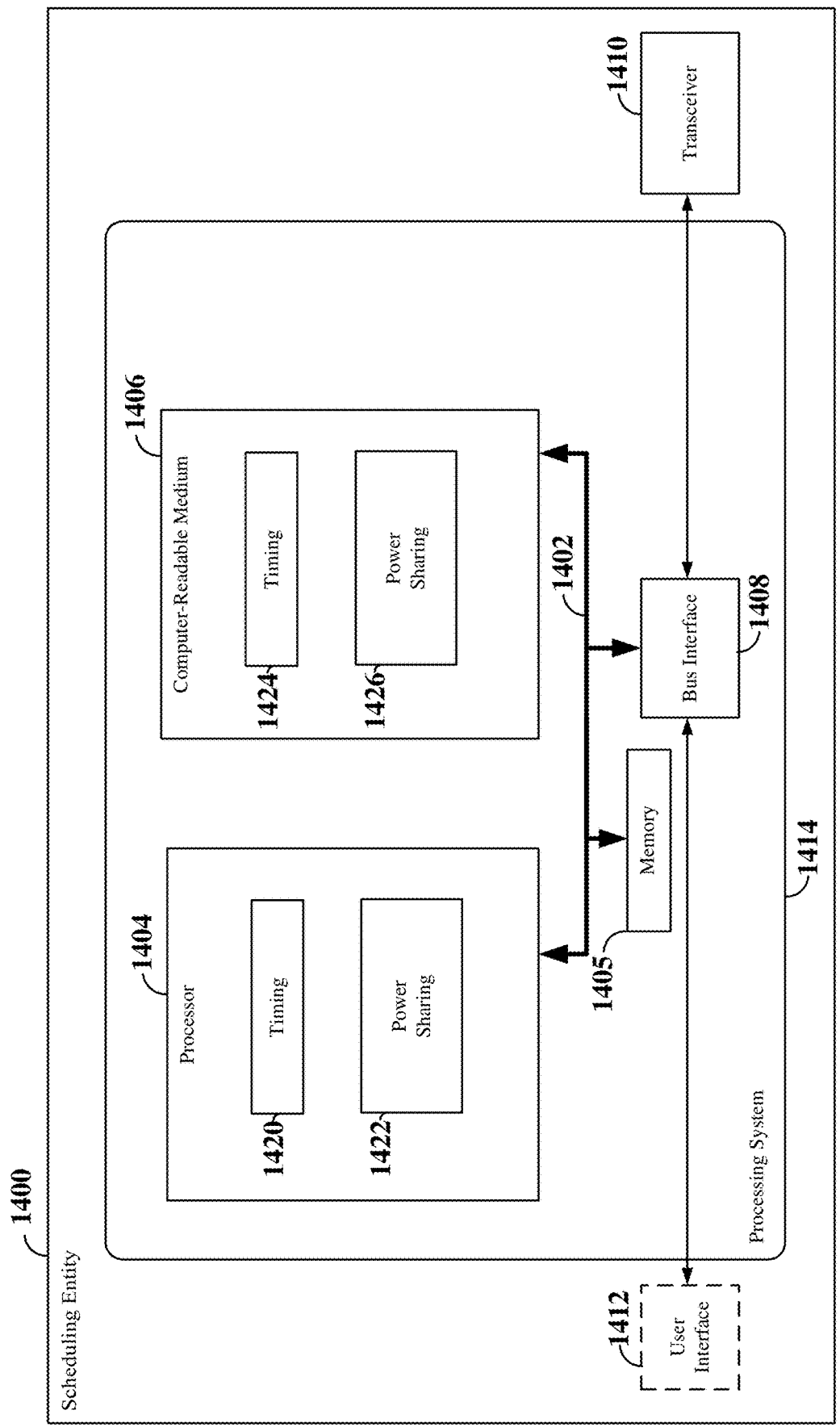
Figure 15:
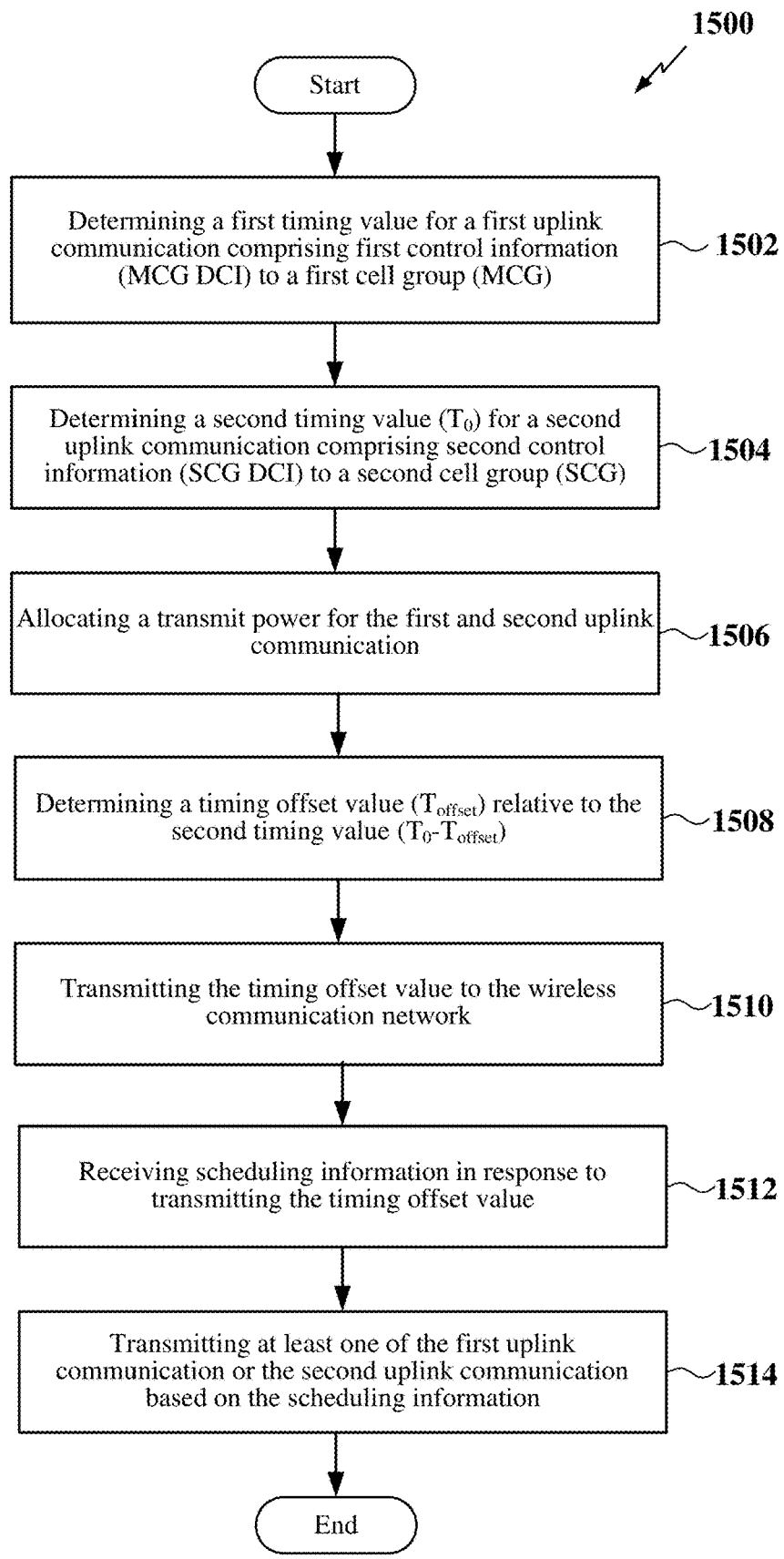

SCG from a network perspective utilizing a fixed transmission time value and two timing offset values according to some aspects;

FIG. 10 is a diagram illustrating dynamic power sharing between a MCG and a SCG from a network perspective utilizing a fixed transmission time value and two timing offset values where the SCG drops a transmission according to some aspects;

FIG. 11 is a diagram illustrating dynamic power sharing between a MCG and a SCG from a network perspective utilizing a fixed transmission time value and two timing offset values where the MCG drops a transmission according to some aspects;

FIG. 12 is a diagram illustrating dynamic power sharing between a MCG and a SCG from a network perspective utilizing a fixed transmission time value and a timing offset value such that the UE splits power between the MSG and SCG according to some aspects;

FIG. 13 is a block diagram illustrating an example of a hardware implementation for a scheduled entity employing a processing system according to some aspects;

FIG. 14 is a block diagram illustrating an example of a hardware implementation for a scheduling entity employing a processing system according to some aspects; and FIG. 15 is a flow chart illustrating a process for processing timing offsets in a dual connectivity (NR-DC) power sharing configuration according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
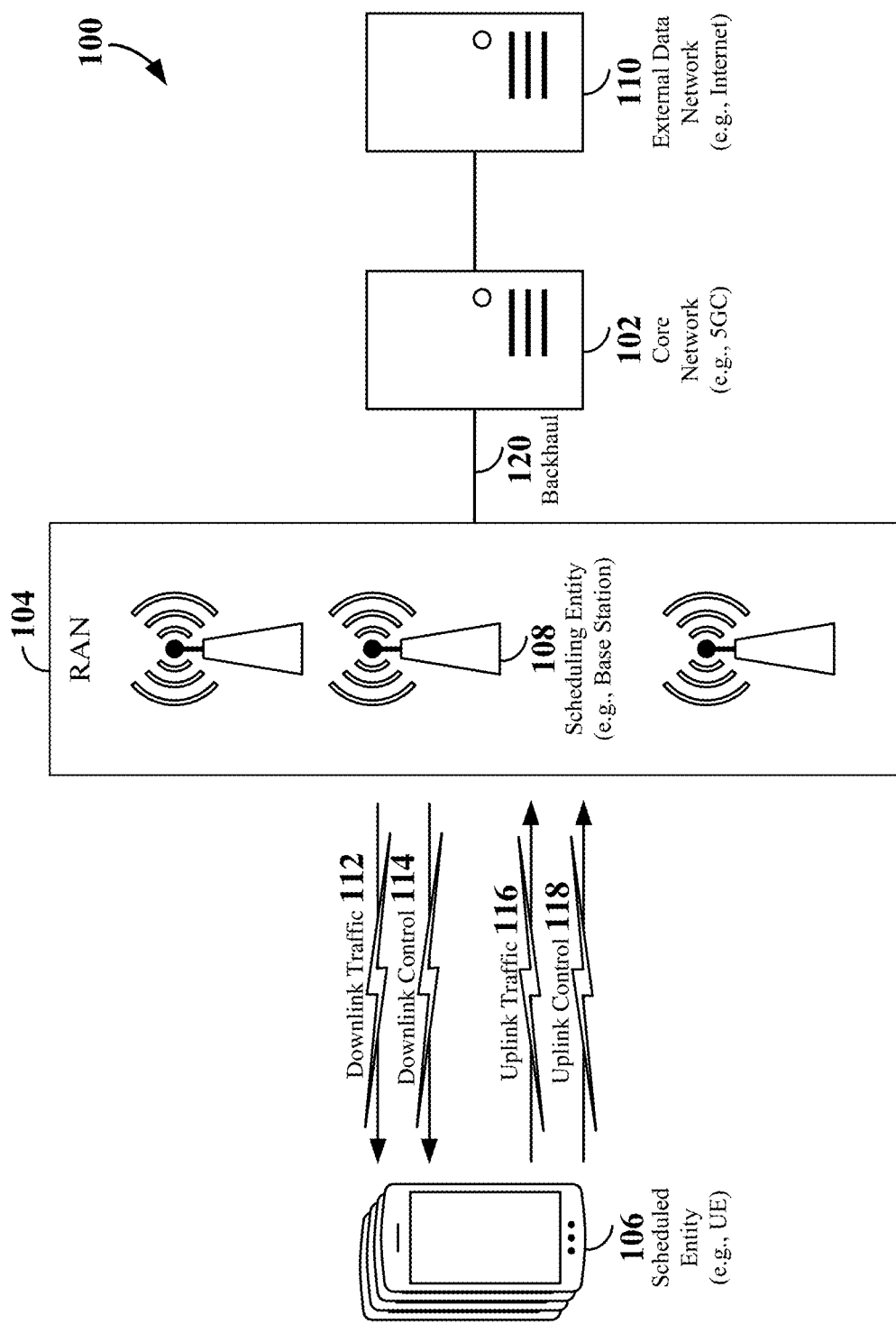
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station (BS) is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities.

That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). Alternately or in addition, the core network 102 may be configured according to a 4G evolved packet core (EPC), or any other suitable standard or configuration.

Figure 2:
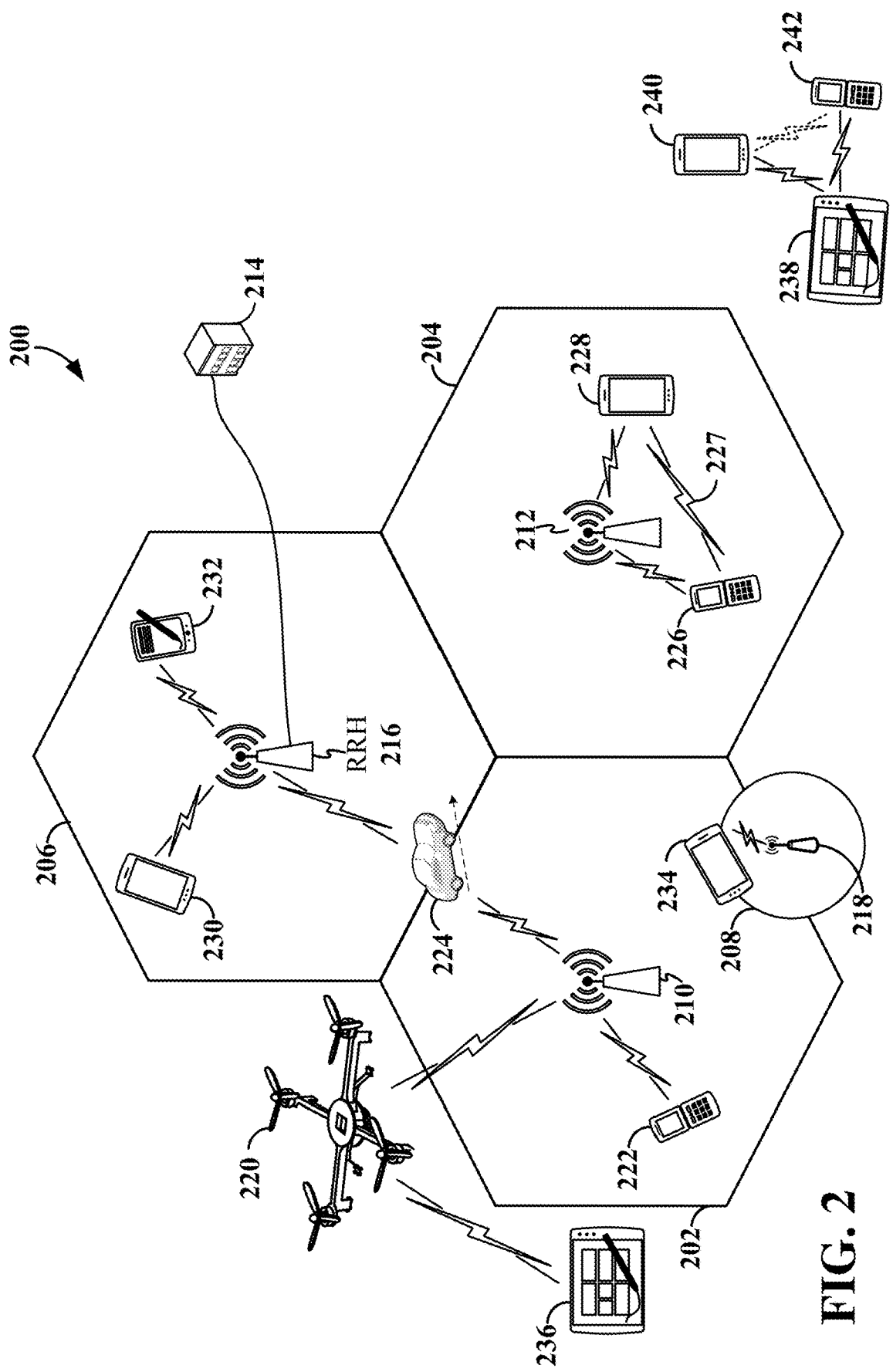
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

When configured in a dual connectivity environment, a UE may be connected simultaneously to two evolved eNode Bs (eNBs) that may include a Master eNB (MeNB) and a Secondary eNB (SeNB), that operate on different carrier frequencies, where at least the Master eNB (or "master node") is connected to the core network (e.g., 102). A Master Cell Group (MCG) may be configured as a group of serving cells associated with the MeNB, while a secondary Cell Group (SCG) may be configured as a group of serving cells associated with the SeNB. From a UE perspective, three bearer types exist for multi-radio access technology (RAT) dual connectivity (MR-DC): Master Cell Group (MCG) bearer, Secondary Cell Group (SCG) bearer and split bearer. A MCG bearer is a radio bearer that is served only by the MeNB, while a SCG is a radio bearer served only by the gNB. A split bearer may be configured as a bearer directly connected from the serving gateway (SGW) to the gNB and is characterized by a single flow that is transmitted from the CN to the PDCP protocol layer located at the gNB. Then, the gNB may split the traffic and forward the packets to the MeNB radio link control (RLC).

Dynamic power sharing allows a UE in dual connectivity scenario to operate in a manner that after allocating the required transmission power of MCG (Master Cell Group), the remainder of uplink power can be allocated to SCG (Secondary Cell Group). For dynamic power sharing, MCG has higher priority than SCG for power allocation. The reason is that the control plane signaling will go through MCG mainly, thus the uplink coverage of MCG shall be guaranteed. With the aid of dynamic power sharing, both LTE and NR uplink transmission do not need a maximum power limit (e.g., 20 dBm) as dual uplink can share power headroom dynamically. This scheme offers the potential of an optimum power allocation between LTE and NR in a UE specific manner based on different coverage scenarios. The same technologies and techniques may also be applied to MCG serving cells and SCG serving cells in dual connectivity (NR-DC) implementations, as described in further detail below.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, where a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity.

That is, in some examples, a UE may function as a scheduling entity, scheduling resources for one or more scheduled entities (e.g., one or more other UEs). In this example, sidelink or other type of direct link signals may be communicated directly between UEs without necessarily relying on scheduling or control information from another entity. For example, UE 238 is illustrated communicating with UEs 240 and 242. In some examples, the UE 238 is functioning as a scheduling entity, while the UEs 240 and 242 may function as scheduled entities.

UEs 238, 240, and 242 may communicate over a direct link in, for example, massive machine type communication (MTC), a device-to-device (D2D), peer-to-peer (P2P), vehicle-to-everything (V2X), and/or in a mesh network. In a mesh network example, UEs 240 and 242 may optionally communicate directly with one another in addition to communicating with a scheduling entity (e.g., UE 238). In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In some examples, two or more UEs (e.g., UEs 226 and 228) within the coverage area of a serving base station 212 may communicate with both the base station 212 using cellular signals and with each other using sidelink signals 227 without relaying that communication through the base station. In this example, the base station 212 or one or both of the UEs 226 and 228 may function as scheduling entities to schedule sidelink communication between UEs 226 and 228. For example, UEs 226 and 228 may communicate sidelink signals 227 within a vehicle-to-everything (V2X) network.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
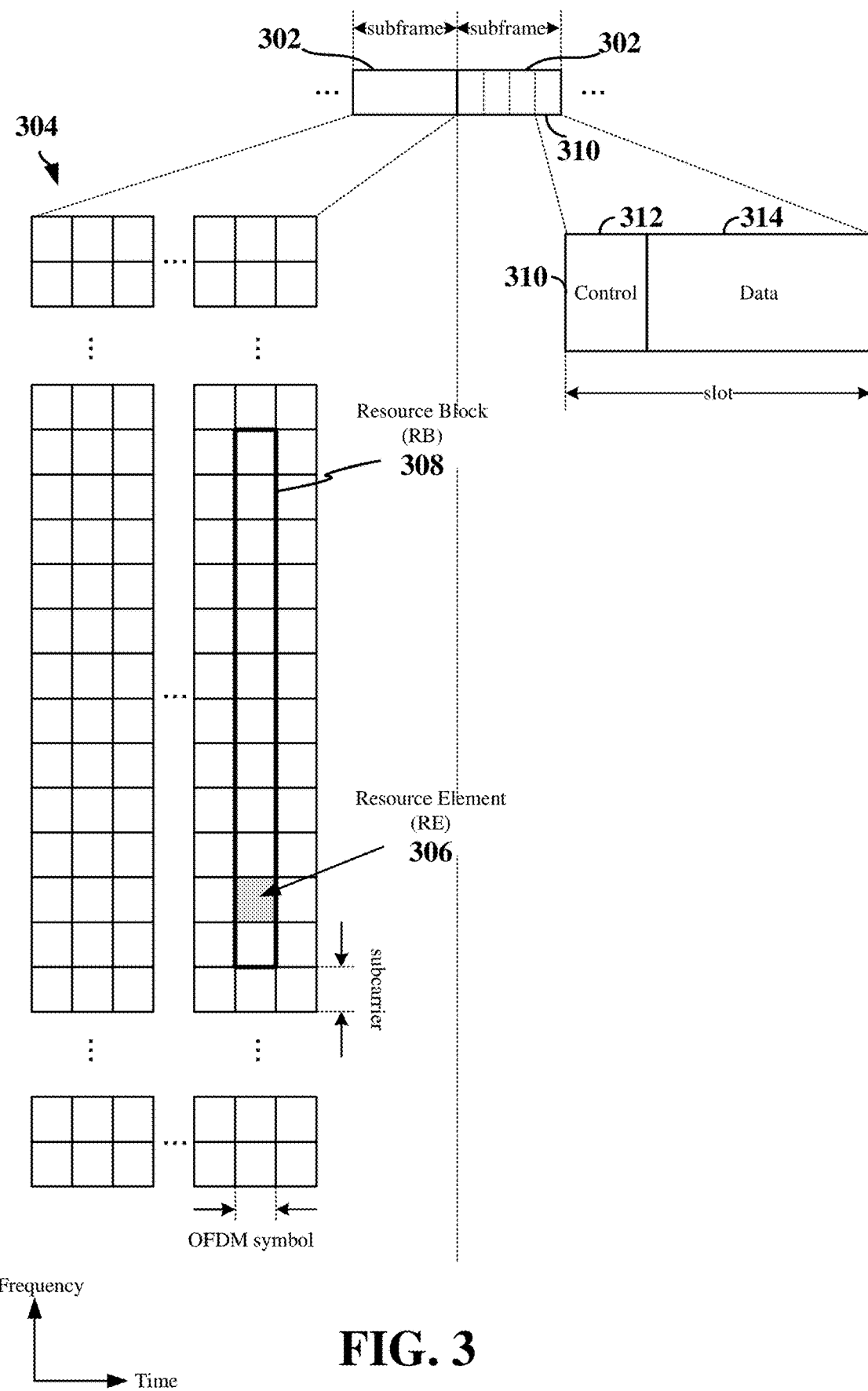
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), CSI-RS, or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random-access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH) and/or a Random Access Channel (RACH). The RACH may be used, for example, in a random-access procedure during initial access of the uplink UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information. UL Transmission can be grant-based (i.e. grant delivered using DCI), or grant-free, including type-1 (e.g., only based on RRC configuration without any L1 signaling) or type-2 (e.g., based on RRC configuration and L1 signaling for activation/deactivation).

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
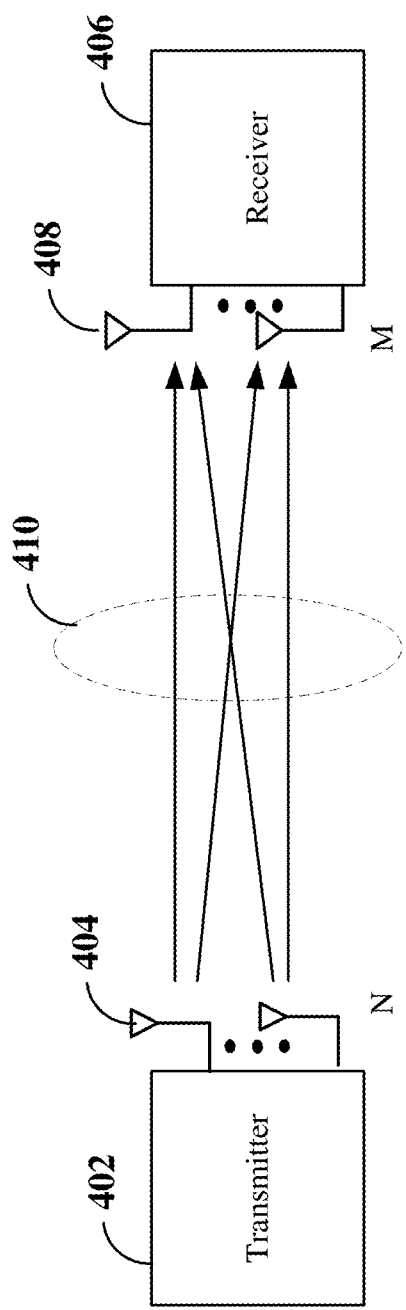
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission.

In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner The UE may measure the reference signal received power (RSRP), reference signal received quality (RSRQ) or SINR on each of the beams and transmit a beam measurement report to the base station indicating the RSRP of each of the measured beams The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In order to gain access to a cell, a UE may perform a random-access procedure over a physical random-access channel (PRACH). The UE may identify a random-access search space including PRACH resources for initiating a RACH procedure from the SIB1. For example, a random-access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIB s (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
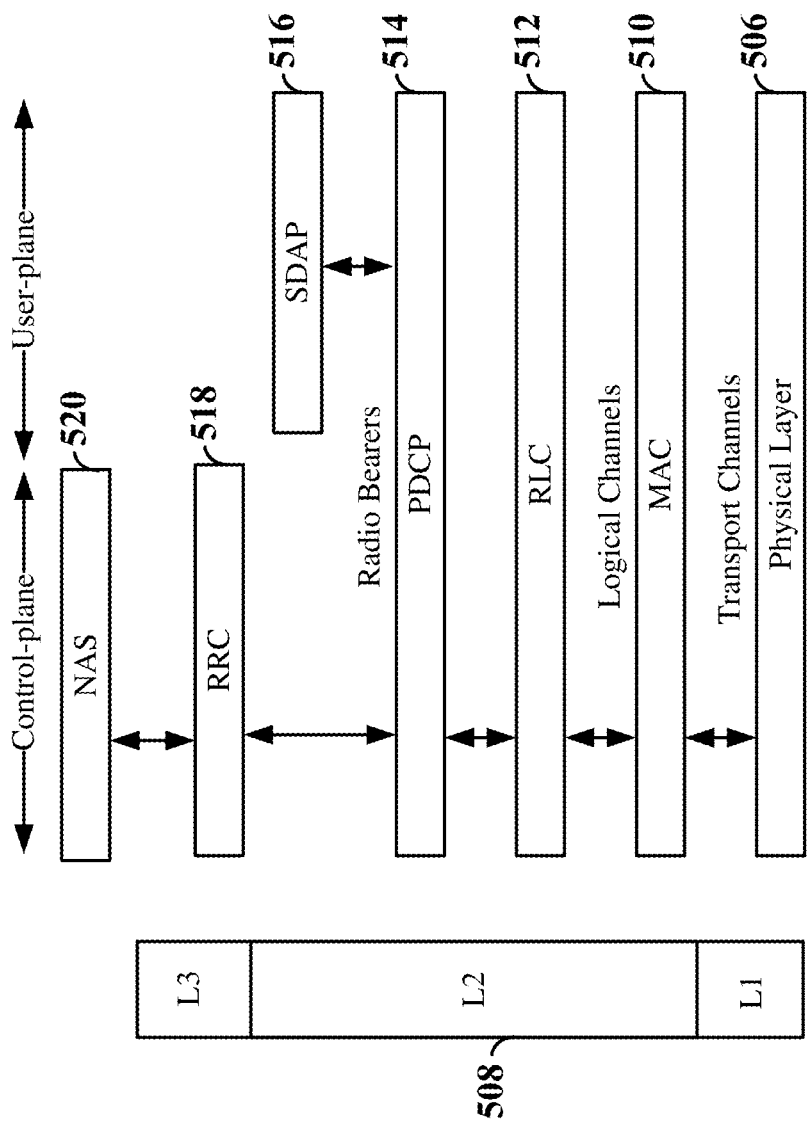
FIG. 5 is a block diagram illustrating a radio protocol architecture for the user and control planes according to some aspects.

As illustrated in FIG. 5, the radio protocol architecture for the UE and the base station includes three layers: layer 1 (L1), layer 2 (L2), and layer 8 (L8). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L8 and a higher Non Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

Figure 6:
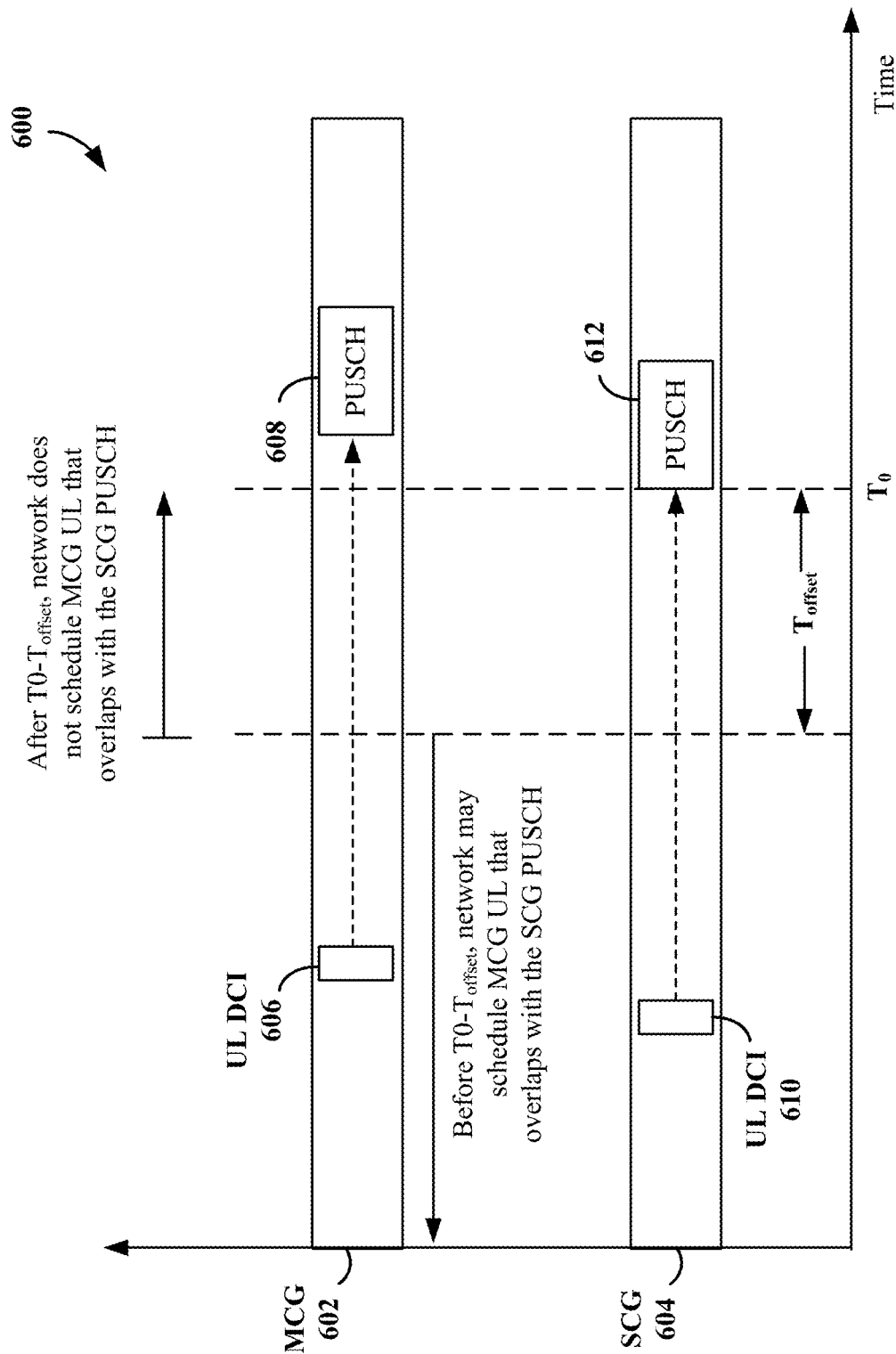
FIG. 6 is a diagram illustrating dynamic power sharing between a master cell group (MCG) and a secondary cell group (SCG) from a UE perspective according to some aspects.

FIG. 6 is a diagram 600 illustrating dynamic power sharing between a master cell group MCG) and a secondary cell group (SCG) from a UE perspective according to some aspects. Under an NR-DC architecture, a NG-RAN may be configured to support NR-NR Dual Connectivity (NR-DC), in which a UE is connected to one gNB that acts as a master node (MN) and another gNB that acts as a secondary node (SN). The master gNB may be connected to the core network (5GC) via the NG interface and to the secondary gNB via the Xn interface. The secondary gNB may be connected to the 5GC via the NG-U interface. In addition, NR-DC can also be used when a UE is connected to two gNB-DUs, one serving the MCG and the other serving the SCG, connected to the same gNB-CU, acting both as a MN and as a SN.

In the example of FIG. 6, a MCG control channel 602 and SCG control channel 604 are shown, where a MCG uplink DCI (UL DCI) 606 is scheduled for transmission on MCG PUSCH 608, and a SCG UL DCI 610 is scheduled for transmission on SCG PUSCH 612, where transmission of UL DCI occurs at $T_0$ as shown in the figure. To compute the transmit power for SCG UL transmission starting at time $T_0$, the UE (e.g., 106) may check for PDCCH(s) received before time $T_0$-$T_{offset}$ that trigger an overlapping MCG UL transmission, and if such PDCCH(s) are detected, the UE sets it's transmit power in SCG (pwr_SCG) such that pwr_SCG≤min $\{P_{SCG}, P_{total}$—MCG tx power$\}$ where PscG is the maximum SCG power for transmission, Ptotai is the configured maximum transmission power, and MCG tx power is the actual transmission power of MCG. Otherwise, the UE sets it's transmit power to pwr_SCG≤$P_{total}$.

For a SCG transmission(s) starting at time $T_0$, the UE may perform a multi-step process using an offset $T_{offset}$ following the timing $T_0$-$T_{offset}$, where the UE may first compute the sum power of MCG transmission(s) that overlaps with the SCG transmission(s) starting at time $T_0$ and then allocate power(s) among SCG transmission(s) starting at time $T_0$ similar to uplink carrier aggregation (UL-CA) using the available power for the SCG transmission(s) identified in the computing step. As is shown in the figure, before $T_0$-$T_{offset}$, the network may schedule MCG UL that may overlap with the SCG PUSCH at time $T_0$, while after $T_0$-$T_{offset}$, the network does not schedule MCG UL that overlaps with the SCG PUSCH at time $T_0$. In some examples, inter-cell-group sum power exchange may be configured one way (e.g., MCG to SCG). For a SCG UL transmission, max power should not be impacted after the deadline ($T_0$-$T_{offset}$). Thus, there would be no need to update the SCG max power during the middle of the SCG UL. In some examples, uplink carrier aggregation (UL-CA) prioritization rules in each cell group (MCG, SCG) may be re-used.

Generally, $T_{offset}$ should be long enough to process the cascaded multi-step process described above (i.e., power allocation cannot be executed until sum power is computed). This may be necessary to guarantee the minimum UE processing time for the SCG transmission(s) starting at time $T_0$ and for any of the MCG transmission(s) overlapping with the SCG transmission starting at time $T_0$. As a nature of dual connectivity, at each MCG scheduling opportunity, a master node (e.g., MgNB) may not know how exactly a secondary node (e.g., SgNB) schedules uplink transmissions on SCG cells to the UE. Because of this, the master node can assume a "worst case" of all the possible minimum UE processing time for SCG, meaning that the master node cannot schedule MCG uplink transmissions overlapping a SCG transmission before the maximum possible UE processing time among all the possible UE processing time for a SCG transmission starting at time $T_0$. As a simplified example, if the SCG transmission starting at time $T_0$ could be either a PUSCH without aperiodic CSI (A-CSI) or a PUSCH with A-CSI, then the MCG DCI scheduling MCG uplink transmission overlapping with the SCG transmission starting at time $T_0$ cannot occur after $T_0$-max$\{T_{proc,2}, T_{proc,CSI}\}$=$T_0$-$T_{proc,CSI}$, where $T_{proc,2}$ is the PUSCH preparation time of the PUSCH scheduled by the PDCCH using the associated PUSCH timing capability, and $T_{proc,CSI}$ is CSI processing time. Under such a configuration, the UE would be able to process dynamic power-sharing with $T_{offset}$ shorter than the maximum possible UE processing time for a SCG transmission.

In some examples, the master node (e.g., MgNB) may be configured to determine exact minimum UE processing time for MCG uplink transmission(s). However, actual UE processing time specified for a CG may depend on various dynamic factors such as DCI indication and Uplink Control Information (UCI) multiplexing. For UE PUSCH preparation procedure time, if the first uplink symbol in the PUSCH allocation for a transport block, including the demodulation reference signal (DM-RS), as defined by the slot offset $K_2$ and the start and length indicator SLIV of the scheduling DCI and including the effect of the timing advance, is no earlier than at symbol $L_2$, where $L_2$ is defined as the next uplink symbol with its cycling prefix starting $$T_{proc,2} = \max((N_2+d_{2,1})(2048+144) \cdot \kappa 2^{-\mu} \cdot T_c, d_{2,2})$$

after the end of the reception of the last symbol of the PDCCH carrying the DCI scheduling the PUSCH, then the UE may transmit the transport block. $N_2$ represents PUSCH preparation time symbols based on a $\mu$ (e.g., 0, 1, 2, etc.) for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is a constant representing $T_S/T_C$ time units (e.g., 64). If the first symbol of the PUSCH allocation consists of DM-RS only, then $d_{2,1}=0$, otherwise $d_{2,1}=1$. If the UE is configured with multiple active component carriers, the first uplink symbol in the PUSCH allocation further includes the effect of timing difference between component carriers. If the scheduling DCI triggered a switch of BWP, $d_{2,2}$ equals to the switching time, otherwise $d_{2,2}=0$. If the PUSCH indicated by the DCI is overlapping with one or more PUCCH channels, then the transport block is multiplexed, otherwise the transport block is transmitted on the PUSCH indicated by the DCI.

When a UE has UCI feedback on the transmission occasion starting at time $T_0$, the minimum processing time may be determined by any of processing times $T_{proc,CSI}$, $T_{proc,release}^{mux}$, $T_{proc,2}^{mux}$, or $T_{proc,CSI}^{mux}$. Configuring $T_{offset}$ to be variable based on these dynamic factors may require the UE to adjust the processing timeline (e.g., for computing the sum power of MCG transmission(s) that overlaps with the SCG transmission(s) starting at time $T_0$) dynamically. Similarly, for SCG cells, $T_{offset}$ should not be shorter than the maximum possible UE processing time among all the possible UE processing times for the MCG transmission that overlaps with the SCG transmission starting at time $T_0$. Generally speaking, $T_{offset}$ should be not smaller than the max $\{T_{proc,MCG}^{max}, T_{proc,SCG}^{max}\}$, where $T_{proc,MCG}^{max}$ denotes the maximum possible minimum UE processing time among some or all of the possible UE processing times for a MCG transmission that overlaps with the SCG transmission starting at time $T_0$, and $T_{proc,SCG}^{max}$ denotes the maximum possible minimum UE processing time among some or all of the possible UE processing times for a SCG transmission starting at time $T_0$.

For dynamic power sharing, a master node may need to know $T_{offset}$ of a SCG used by a UE. If the $T_{offset}$ is not available, the master node may assume $T_{offset}$ to be a largest possible value. In order to determine $T_{offset}$, the master node may decode a SCG RRC configuration using inter-node messaging to identify the $T_{offset}$ used by the UE. The SCG RRC configuration used by the master node may include RRC parameters that impact $T_{proc,CSI}$, $T_{proc,release}^{mux}$, $T_{proc,2}^{mux}$, and/or $T_{proc,CSI}^{mux}$. However, in certain operating environments, the master node may not be configured to decode the UE SCG RRC configuration received by a secondary node of a SCG. In cases where an SCG RRC reconfiguration is transmitted via an inter-node RRC message to the master node, the master node will typically place the RRC message in a container and forward it to the UE via the MCG RRC reconfiguration.

In order to address such issues, $T_{offset}$ values may be used under some examples that are not dependent on RRC configurations. In one example, fixed duration values (e.g., 1.5 ms, 4 ms, etc.) may be used. However, in order to use a fixed duration value for $T_{offset}$, the chosen value(s) should be such that it is compatible with $T_{proc,CSI}$, $T_{proc,release}^{mux}$, $T_{proc,2}^{mux}$, and/or $T_{proc,CSI}^{mux}$ values. For example, if a UE reports its capability of a fixed $T_{offset}$ value, and the fixed $T_{offset}$ value has a longer time duration than any of $T_{proc,CSI}$, $T_{proc,release}^{mux}$, $T_{proc,2}^{mux}$, and/or $T_{proc,CSI}^{mux}$, then UL DCI may be transmitted on PUSCH. However, if the fixed $T_{offset}$ value has a shorter time duration, the UE should ensure that the DCI in the MCG at time $T_0$-$T_{offset}$ can be properly processed independently from any RRC configuration.

Figure 7:
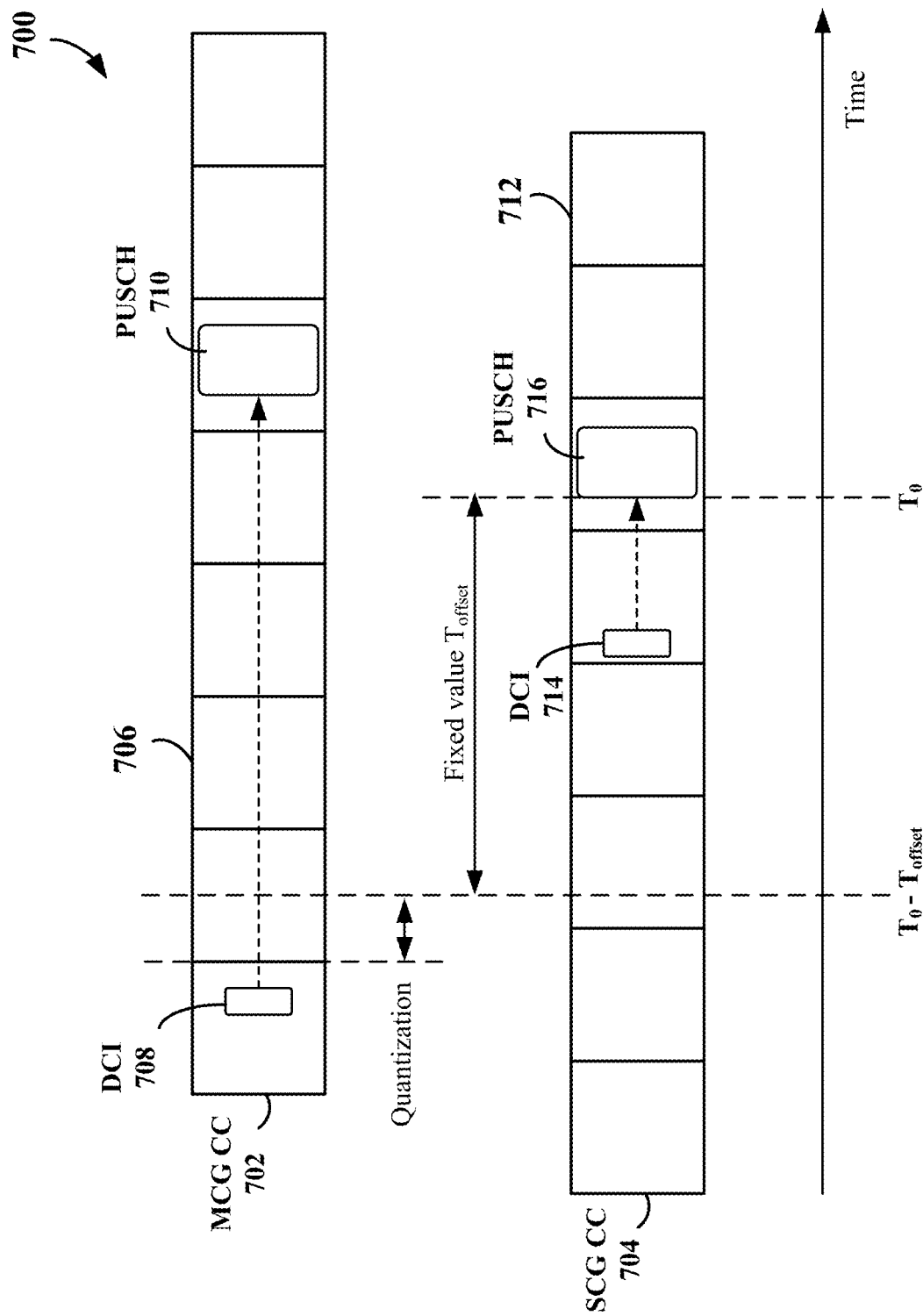

FIG. 7 is a diagram 700 illustrating dynamic power sharing between a MCG and a SCG utilizing a quantized fixed transmission time value and timing offset value according to some aspects. Similar to FIG. 6, the example of FIG. 7 shows an EN-DC operating environment, where a MCG control channel 702 and SCG control channel 704 are shown, each including a plurality of slots 706, 712 for each respective control channel. The example shows a MCG UL DCI 706 that is scheduled for transmission on MCG PUSCH 710, and a SCG UL DCI 714 that is scheduled for transmission on SCG PUSCH 716, where transmission of UL DCI occurs at $T_0$ as shown in the figure.

In some examples, the value of $T_{offset}$ may be configured to have different $T_{offset}$ value candidates for different frequency bands (e.g., FR1, FR2) having different frequency ranges and data rate capabilities. As an example, $T_{offset}$ candidate values may be configured as {2 ms, 4 ms} for FR1 and {1 ms, 3 ms} for FR2. During operation, the UE may select one value (e.g., 4 ms) for FR1, and another value (e.g., 1 ms) for FR2 for transmitting UL DCI. The UE may report a selected (preferred) initial value for each FR via UE capability signaling. In one example, for a given band combination, if the UE supports NR-DC and MCG cell(s) and SCG cell(s) are both in FR1, then the UE reports one selected value (e.g., 2 ms or 4 ms) for FR1 $T_{offset}$. In another example, if the UE supports NR-DC and MCG cell(s) and SCG cell(s) are both in FR2, then the UE reports one selected value (e.g., 1 ms or 3 ms) for FR2 $T_{offset}$. In a further example, if the UE does not support NR-DC when MCG cell(s) and SCG cell(s) are both in FR1 or FR2, but does support NR-DC where MCG cell(s) are in FR1 or FR2 and SCG cells(s) are in FR2 or FR1 respectively, then the UE does not report any value for the $T_{offset}$ determination, since the cells are not sharing power in the same frequency range.

In another example, instead of using fixed time values as described above (e.g., 2 ms), the UE can measure an index, such as a sampling index, symbol index, slot index or subframe index. Based on these measurements, the UE may then base $T_{offset}$ according to an OFDM symbol value instead of a fixed time value. Thus, a $T_{offset}$ value may be determined, for example, to be a configured number of symbols (e.g., 28 symbols) for a given sub-carrier spacing (SCS) (e.g., 15 khz). The $T_{offset}$ symbol number may be set to reference SCS as 15 kHz or 30 kHz for FR1, and 60 kHz or 120 kHz for FR2. In some examples, the SCS selection may be fixed and not configurable by higher-level signaling.

In the example of FIG. 7, a fixed $T_{offset}$ value is selected by the UE (e.g., 1.5 ms) as discussed above, which in turn determines a $T_0$-$T_{offset}$ value as shown in the figure. Here, the $T_0$-$T_{offset}$ value may occur in the middle of a slot (706). The UE may be configured to quantize the $T_0$-$T_{offset}$ value to a timing boundary, such as a slot boundary and extend the $T_0$-$T_{offset}$ value to the boundary itself. Under this configuration, if the $T_0$-$T_{offset}$ value is between boundaries of a slot (e.g., the middle of a slot), the DCI will be assumed to be not present within that slot.

FIG. 8 is a diagram 800 illustrating dynamic power sharing between a MCG and a SCG from a network perspective utilizing a fixed transmission time value ($T_0$) and timing offset value ($T_{offset(value1)}$) according to some aspects. Similar to the example of FIG. 6, the example of FIG. 8 shows an EN-DC operating environment, where a MCG control channel 802 and SCG control channel 804 are shown, each including a plurality of slots 806, 812 for each respective control channel. The example shows a MCG UL DCI 808 that is scheduled for transmission on MCG PUSCH 810, and a SCG UL DCI 814 that is scheduled for transmission on SCG PUSCH 816, where transmission of UL DCI occurs at $T_0$ as shown in the figure.

In this example, the network may consider two $T_{offset}$ values, where a first $T_{offset}$ value may be a network-based value ($T_{offset(value1)}$) and a second value may be a UE-based value ($T_{offset(value2)}$) The network-based value may be, for example, a fixed value (e.g., 1.5 ms), while the UE-based value may be, for example, an UL processing time (e.g., $T_{proc}$) During operation, if $T_0$-$T_{offset(value1)}$ is earlier than $T_0$-$T_{offset(value2)}$, the network may not transmit a MCG DCI after $T_0$-$T_{offset(value1)}$ as is shown in the figure. If $T_0$-$T_{offset(value2)}$ is earlier than $T_0$-$T_{offset(value1)}$, the network may transmit a MCG DCI after $T_0$-$T_{offset(value2)}$. In this case, the UE may perform a number of operations with regard to scheduling the DCI transmission. In a first option, the UE may drop the SCG transmission starting at time $T_0$. In a second option, the UE may drop the MCG transmission overlapping with the SCG transmission. In a third option, the UE may select either or both of the first option and/or the second option according to UE implementation. Further discussion of these configurations is provided below in connection with FIGS. 9-11.

FIG. 9 is a diagram 900 illustrating dynamic power sharing between a MCG and a SCG from a network perspective utilizing a fixed transmission time value ($T_0$) and two timing offset values ($T_{offset(value1)}$, $T_{offset(value2)}$) according to some aspects. The example of
FIG. 9 is similar to the configuration of FIG. 8, where a MCG control channel 902 and SCG control channel 904 are shown, each including a plurality of slots 906, 912 for each respective control channel. The example shows a MCG UL DCI 908 that is scheduled for transmission on MCG PUSCH 910, and a SCG UL DCI 914 that is scheduled for transmission on SCG PUSCH 916, where transmission of UL DCI occurs at $T_0$ as shown in the figure.

In this example, it can be seen that $T_{offset(value1)}$ for the SCG occurs earlier in time compared to $T_{offset(value2)}$ for the MCG. As discussed above, $T_{offset(value1)}$ may be a network-based value (e.g., 1.5 ms), while $T_{offset(value1)}$ may be a UE-based value (e.g., $T_{proc}$). During operation, the UE may need to calculate SCG uplink power, which may occur during the time period denoted by $T_{offset(value2)}$ However, as can be seen in the figure, the SCG DCI 914 occurs after $T_{offset(value1)}$ Nevertheless, since the MCG DCI 908 occurs prior to $T_{offset(value1)}$, the DCI is not needed, and thus not received after $T_{offset(value1)}$ Accordingly, When the UE receives MCG DCI 908 before $T_0$-$T_{offset(value1)}$, the MCG side of the UE does not know if there is any SCG transmission that overlaps with the MCG DCI 908. As a result, the UE may compute MCG transmission power. Later, when the UE receives SCG DCI 914, scheduling SCG UL transmission starting at time $T_0$, the UE may compute SCG transmission power based on the SCG DCI 914 and the MCG transmission power that is computed by MCG DCI through $T_0$-$T_{offset(value2)}$.

FIG. 10 is a diagram 1000 illustrating dynamic power sharing between a MCG and a SCG from a network perspective utilizing a fixed transmission time value and two timing offset values where the SCG drops a transmission according to some aspects. The example of FIG. 10 is similar to the configuration of FIG. 9, where a MCG control channel 1002 and SCG control channel 1004 are shown, each including a plurality of slots 1006, 1012 for each respective control channel. The example shows a MCG UL DCI 1008 that is scheduled for transmission on MCG PUSCH 1010, and a SCG UL DCI 1014 that is scheduled for transmission on SCG PUSCH 1016, where transmission of UL DCI occurs at $T_0$ as shown in the figure. In this example, it can be seen that $T_{offset(value2)}$ for the MCG occurs earlier in time compared to $T_{offset(value1)}$ for the SCG. Again, $T_{offset(value1)}$ may be a network-based value (e.g., 1.5 ms), while $T_{offset(value1)}$ may be a UE-based value (e.g., $T_{proc}$). However, as can be seen in the figure, the MCG DCI 1008 occurs after $T_{offset(value2)}$. In this case, the network may transmit a MCG DCI during the time period between $T_0$-$T_{offset(value2)}$ and $T_0$-$T_{offset(value1)}$.

With the UE receiving MCG DCI between $T_0$-$T_{offset(value2)}$ and $T_0$-$T_{offset(value1)}$, the UE may then drop the SCG UL transmission at time $T_0$, shown as an "X" in the figure, since the UE would not have enough time to calculate the transmission power for the SCG uplink transmission, as it occurs after $T_{offset(value2)}$. This configuration may be advantageous if there is sufficient time to drop (cancel) the SCG UL transmission when the UE knows the MCG DCI (1008). In this example, the MCG would have the time period between $T_{offset(value1)}$ and the SCG DCI 1014 to notify the SCG to drop the transmission.

Accordingly, when the UE receives MCG DCI 1008 between $T_0$-$T_{offset(value2)}$ and $T_0$-$T_{offset(value1)}$, the MCG side of the UE does not know if there is any SCG transmission that overlaps with the MCG. As such, the UE computes MCG transmission power. Later, when the UE receives SCG DCI 1014, scheduling SCG UL transmission starting at time $T_0$, the UE can identify that there is a MCG DCI 1008 after $T_0$-$T_{offset(value2)}$, and that the MCG DCI 1008 is in an overlapping schedule. To avoid potential violation of a maximum available power configuration, the SCG side of the UE can drop the SCG transmission starting at time $T_0$, as shown.

FIG. 11 is a diagram 1100 illustrating dynamic power sharing between a MCG and a SCG from a network perspective utilizing a fixed transmission time value ($T_0$) and two timing offset values ($T_{offset(value1)}$, $T_{offset(value2)}$), where the MCG drops a transmission according to some aspects. The example of FIG. 11 is similar to the configuration of FIG. 10, where a MCG control channel 1102 and SCG control channel 1104 are shown, each including a plurality of slots 1106, 1112 for each respective control channel. The example shows a MCG UL DCI 1108 that is scheduled for transmission on MCG PUSCH 1110, and a SCG UL DCI 1114 that is scheduled for transmission on SCG PUSCH 1116, where transmission of UL DCI occurs at $T_0$ as shown in the figure. In this example, it can be seen that $T_{offset(value2)}$ for the MCG occurs earlier in time compared to $T_{offset(value1)}$ for the SCG. Again, $T_{offset(value1)}$ may be a network-based value (e.g., 1.5 ms), while $T_{offset(value1)}$ may be a UE-based value (e.g., $T_{proc}$). In contrast to the example of FIG. 11, the MCG DCI 1008 still occurs after $T_{offset(value2)}$, but the SCG DCI 1114 occurs before $T_{offset(value2)}$. In this case, the network may transmit a MCG DCI during the time period between $T_0$-$T_{offset(value2)}$ and $T_0$-$T_{offset(value1)}$ However, since the MCG side of the UE knows that there is a SCG UL transmission scheduled at time T0, the UE may drop the MCG transmission (shown as "X" in the figure) overlapping with the SCG transmission.

Accordingly, when the UE receives MCG DCI 1108 between $T_0 - T_{offset(value2)}$ and $T_0 - T_{offset(value1)}$, if the MCG side of the UE knows there is an SCG transmission that overlaps with the MCG, the UE can drop the MCG transmission 1110. When the UE receives SCG DCI 1114 scheduling SCG UL transmission starting at time $T_0$, the UE can recognize that there is a DCI scheduling MCG transmission that overlaps with the SCG UL transmission. To avoid potential violation of maximum available power configurations, the SCG side of the UE can drop the MCG transmission at time $T_0$ In the example of FIG. 11, the disclosed configuration may be modified by setting $T_{offset(value2)}$ to one of $T_{proc,CSI}$, $T_{proc,release}^{mux}$, $T_{proc,2}^{mux}$ and/or $T_{proc,CSI}^{mux}$ for the MCG or for the SCG, depending on whether the UL transmission includes CSI or not, whether the UL transmission is a response to a semi-persistent scheduling (SPS) release, or whether the UL transmission carries out UCI multiplexing on PUSCH on the cell group. In other words, $T_{offset(value2)}$ may be set according to actual UL processing time. In another example, $T_{offset(value2)}$ may be set to one of $T_{proc,CSI}$, $T_{proc,release}^{mux}$, $T_{proc,2}^{mux}$, and/or $T_{proc,CSI}^{mux}$ for the MCG and for the SCG, where $T_{offset(value2)}$ is determined based on the maximum possible UL processing time among possible UL processing times.

FIG. 12 is a diagram 1200 illustrating dynamic power sharing between a MCG and a SCG from a network perspective utilizing a fixed transmission time value ($T_1$) and a timing offset value ($T_{offset}$) such that the UE splits power between the MSG and SCG according to some aspects. Similar to the other examples, the example of FIG. 12 shows an EN-DC operating environment, where a MCG control channel 1202 and SCG control channel 1204 are shown, each including a plurality of slots 1206, 1212 for each respective control channel. The example shows a MCG UL DCI 1208 that is scheduled for transmission on MCG PUSCH 1210, and a SCG UL DCI 1214 that is scheduled for transmission on SCG PUSCH 1216, where transmission of UL DCI occurs at $T_1$ as shown in the figure.

In this example, $T_{offset}$ may be a fixed value and $T_1 - T_{offset}$ may be determined based on the MCG transmission starting time $T_1$, which is based on MCG UL transmission time (1210) and may not correspond with the SCG UL transmission time (1216). For SCG UL transmission, the maximum sum power for SCG=min $\{P_{SCG}, P_{total}-\text{MCG Tx power}\}$, and MCG transmission power is calculated based on the MCG DCIs (1208) through $T_1 - T_{offset}$. After time $T_1 - T_{offset}$, the network may be configured not to schedule MCG UL overlapping with the SCG PUSCH 1216 at time $T_1$. Before time $T_1 - T_{offset}$ however, the network may be configured to schedule MCG UL overlapping with the SCG PUSCH. Inter-cell-group sum power exchange may be configured in some examples to be one-way (e.g., MCG to SCG). For a SCG UL transmission, maximum power is not impacted after the deadline ($T_1 - T_{offset}$), meaning that there is no need to update the SCG maximum power during the middle of the SCG UL. In some examples, UL-CA prioritization rules may be re-used in each cell group. In some examples, the UE may report the value of $T_{offset}$ as a capability.

FIG. 13 is a block diagram illustrating an example of a hardware implementation for a scheduled entity (UE) 1300 employing a processing system 1314 according to some aspects. For example, the scheduled entity 1300 may be a user equipment (UE) as illustrated in any one or more of FIGS. 1 and/or 2.

The scheduled entity 1300 may be implemented with a processing system 1314 (or "processing apparatus") that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1300 may be configured to perform any one or more of the functions described herein, including, but not limited to, power measurement, power sharing, UL timing and offset timing. That is, the processor 1304, as utilized in the scheduled entity 1300, may be used to implement any one or more of the processes and procedures described herein.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium.

Depending upon the nature of the apparatus, a user interface 1312 (e.g., keypad, display, speaker, microphone, joystick) may also be provided. Of course, such a user interface 1312 is optional, and may be omitted in some examples.

In some aspects of the disclosure, the processor 1304 may include timing 1320 configured to implement, for example, UL timing and timing offset procedures described herein, such as technologies and techniques described in FIGS. 6-12 above. Power sharing circuitry 1322 may be configured, for example, to power measurement and/or power sharing, such as those described herein, and techniques described in FIGS. 6-12 above.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system 1314 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random-access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include timing instructions 1324 configured for various functions, including, but not limited to, uplink timing and/or offset timing associated with functions of timing processor 1320. The computer-readable storage medium 1306 may also include power sharing instructions 1326 configured for various functions, including, but not limited to, power measurement and power sharing associated with the functions of power sharing circuitry 1322.

Of course, in the above examples, the circuitry included in the processor 1314 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-2 and 4, and utilizing, for example, the processes and/or algorithms described herein.

FIG. 14 is a block diagram illustrating an example of a hardware implementation for a scheduling entity 1400 employing a processing system according to some aspects. The scheduling entity 1400 is shown employing a processing system 1414. For example, the scheduling entity 1400 may be a base station (such as eNB, gNB), or other scheduling entity as illustrated in any one or more of FIGS. 1 and 2.

The scheduling entity 1400 may be implemented with a processing system 1414 similar to processing system 1314 discussed above in connection with FIG. 13, and includes one or more processors 1404 that may be used to implement any one or more of the processes and procedures described herein. In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 also may link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium (such as air). Depending upon the nature of the apparatus, a user interface 1412 (such as keypad, display, speaker, microphone, joystick, touchscreen) also may be provided. Of course, such a user interface 1412 is optional, and may be omitted in some examples.

The processor 1404 is responsible for managing the bus 1402 and general processing, including the execution of software stored on the computer-readable medium 1406 or memory 1405. The software, when executed by the processor 1404, causes the processing system 1414 to perform the various functions described herein for any particular apparatus. The computer-readable medium 1406 and the memory 1405 also may be used for storing data that is manipulated by the processor 1404 when executing software. One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406, which may be similar to computer-readable medium 1306 described in FIG. 13.

In some aspects of the disclosure, the processor 1404 may include circuitry configured for various functions. For example, the processor 1404 may include random access circuitry 1420, configured to implement, for example, initial access and RACH procedures described herein, such as technologies and techniques described in FIGS. 6-10 above. CSI/CQI circuitry 1122 may be configured, for example, to implement CSI/CQI report processing and signaling, such as those described herein, and techniques described in FIGS. 6-10 above.

In one or more examples, the computer-readable storage medium 1406 may include random access instructions 1424 configured for various functions, including, but not limited to, initial access and RACH processing associated with functions of random access processor 1420. The computer-readable storage medium 1406 may also include CSI/CQI instructions 1426 configured for various functions, including, but not limited to, CSI/CQI report processing and signaling associated with the functions of CSI/CQI circuitry 1422.

Of course, in the above examples, the circuitry included in the processor 1414 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-2 and 4, and utilizing, for example, the processes and/or algorithms described herein.

FIG. 15 is a flow chart illustrating a process 1500 for processing timing offsets in a NR-DC power sharing configuration according to some aspects. In block 1502 a scheduled entity (e.g., UE) may determine a first timing value for a first uplink communication comprising first control information (e.g., MCG DCI) to a first cell group (e.g., MCG). In block 1504, the UE may determine a second timing value ($T_0$) for a second uplink communication comprising second control information (e.g., SCG DCI) to a second cell group (e.g., SCG). In block 1506, the UE allocates a transmit power for the first and second uplink communication, and determines a timing offset value ($T_{offset}$) relative to the second timing value ($T_0$-$T_{offset}$) in block 1508. In block 1510, the UE transmits the timing offset value to the wireless communication network, and receives scheduling information (e.g., UCI) in response to transmitting the timing offset value in block 1512. In block 1514, the UE may transmit at least one of the first uplink communication (MCG DCI) or the second uplink communication (SCG DCI) based on the scheduling information.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2 4, 13, and 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of power sharing by a scheduled entity in a wireless communication network, the method comprising:
   determining a first timing value for a first uplink communication comprising first control information to a first cell group operating in a first frequency band;
   determining a second timing value for a second uplink communication comprising second control information to a second cell group operating in a second frequency band;
   determining a timing offset value relative to the second timing value, wherein the timing offset value comprises one or more first fixed values associated with the first frequency band, and one or more second fixed values associated with the second frequency band;
   transmitting the timing offset value to the wireless communication network;
   receiving scheduling information in response to transmitting the timing offset value; and
   transmitting at least one of the first uplink communication or the second uplink communication based on the scheduling information.

2. The method of claim 1, wherein the fixed value comprises a time period.

3. The method of claim 1, wherein the fixed value comprises a number of transmission symbols.

4. The method of claim 3, further comprising:
   measuring one of a sampling index, a symbol index, a slot index or a subframe index to determine the number of transmission symbols.

5. The method of claim 1, wherein the timing offset value is determined from an uplink processing time measurement.

6. The method of claim 1, further comprising determining a second timing offset value relative to the first timing value.

7. The method of claim 6, further comprising determining whether the timing offset value relative to the second timing value is earlier in time than the second timing offset value relative to the first timing value.

8. The method of claim 7, further comprising transmitting only the first uplink communication if the timing offset value relative to the second timing value is not earlier in time than the second timing offset value relative to the first timing value.

9. The method of claim 7, further comprising transmitting only the second uplink communication if the timing offset value relative to the second timing value is earlier in time than the second timing offset value relative to the first timing value.

10. The method of claim 1, wherein the first control information and the second control information each comprise respective uplink control information (UCI).

11. The method of claim 1, wherein the scheduling information comprises receiving downlink control information (DCI).

12. A user equipment (UE) within a wireless communication network, comprising:
   one or more memories; and
   one or more processors coupled to the one or more memories, wherein the one or more processors are configured to cause the UE to:
      determine a first timing value for a first uplink communication comprising first control information to a first cell group operating in a first frequency band;
      determine a second timing value for a second uplink communication comprising second control information to a second cell group operating in a second frequency band;
      determine a timing offset value relative to the second timing value, wherein the timing offset value comprises one or more first fixed values associated with the first frequency band, and one or more second fixed values associated with the second frequency band;
      transmit the timing offset value to the wireless communication network;
      receive scheduling information in response to transmitting the timing offset value; and
      transmit at least one of the first uplink communication or the second uplink communication based on the scheduling information.

13. The UE of claim 12, wherein the fixed value comprises a time period.

14. The UE of claim 12, wherein the fixed value comprises a number of transmission symbols.

15. The UE of claim 14, wherein the one or more processors are further configured to cause the UE to:
   measure one of a sampling index, a symbol index, a slot index or a subframe index to determine the number of transmission symbols.

16. The UE of claim 14, wherein the timing offset value is determined from an uplink processing time measurement.

17. The UE of claim 12, wherein the one or more processors are further configured to cause the UE to:
   determine a second timing offset value relative to the first timing value.

18. The UE of claim 17, wherein the one or more processors are further configured to cause the UE to:
determine whether the timing offset value relative to the second timing value is earlier in time than the second timing offset value relative to the first timing value.

19. The UE of claim 18, wherein the one or more processors are further configured to cause the UE to:
   transmit only the first uplink communication if the timing offset value relative to the second timing value is not earlier in time than the second timing offset value relative to the first timing value.

20. The UE of claim 18, wherein the one or more processors are further configured to cause the UE to:
   transmit only the second uplink communication if the timing offset value relative to the second timing value is earlier in time than the second timing offset value relative to the first timing value.

21. The UE of claim 12, first and control information and the second control information each comprise respective uplink control information (UCI).

22. The UE of claim 12, wherein the scheduling information comprises receiving downlink control information (DCI).

23. A user equipment (UE) in a wireless communication network, comprising:
   means for determining a first timing value for a first uplink communication comprising first control information to a first cell group operating in a first frequency band;
   means for determining a second timing value for a second uplink communication comprising second control information to a second cell group operating in a second frequency band;
   means for determining a timing offset value relative to the second timing value, wherein the timing offset value comprises one or more first fixed values associated with the first frequency band, and one or more second fixed values associated with the second frequency band;
   means for transmitting the timing offset value to the wireless communication network;
   means for receiving scheduling information in response to transmitting the timing offset value; and
   means for transmitting at least one of the first uplink communication or the second uplink communication based on the scheduling information.

24. A non-transitory computer-readable medium having stored therein instructions executable by one or more processors to cause the UE to:
   determine a first timing value for a first uplink communication comprising first control information to a first cell group operating in a first frequency band;
   determine a second timing value for a second uplink communication comprising second control information to a second cell group operating in a second frequency band;
   determine a timing offset value relative to the second timing value, wherein the timing offset value comprises one or more first fixed values associated with the first frequency band, and one or more second fixed values associated with the second frequency band;
   transmit the timing offset value to the wireless communication network;
   receive scheduling information in response to transmitting the timing offset value; and
   transmit at least one of the first uplink communication or the second uplink communication based on the scheduling information.

* * * * *